US007785459B2

(12) United States Patent
Raju et al.

(10) Patent No.: US 7,785,459 B2
(45) Date of Patent: Aug. 31, 2010

(54) MICRONEEDLES AND METHODS OF FABRICATING

(75) Inventors: Ramesh S/O Govinda Raju, Singapore (SG); Ming-Li Tan, Singapore (SG); Yusua Agabus, Singapore (SG); Patricia A. Beck, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1130 days.

(21) Appl. No.: 11/420,764

(22) Filed: May 28, 2006

(65) Prior Publication Data

US 2006/0226016 A1 Oct. 12, 2006

Related U.S. Application Data

(63) Continuation-in-part of application No. 10/972,196, filed on Oct. 22, 2004, now Pat. No. 7,097,776.

(51) Int. Cl.
C25D 1/02 (2006.01)
(52) U.S. Cl. .................. 205/73; 205/67; 216/2; 216/11; 216/41
(58) Field of Classification Search .................. 205/67, 205/70, 73; 216/2, 11, 41
See application file for complete search history.

(56) References Cited

U.S. PATENT DOCUMENTS

| 6,334,856 B1 | 1/2002 | Allen |
| 6,749,792 B2 | 6/2004 | Olson |
| 7,097,776 B2 * | 8/2006 | Govinda Raju .............. 216/11 |
| 2002/0155737 A1 | 10/2002 | Roy et al. |
| 2005/0011858 A1 * | 1/2005 | Kuo et al. ..................... 216/17 |
| 2005/0029223 A1 | 2/2005 | Yeshurun et al. |
| 2005/0171480 A1 | 8/2005 | Mukerjee et al. |
| 2006/0030812 A1 | 2/2006 | Golubovic-Liakopoulos et al. |

* cited by examiner

Primary Examiner—Nam X Nguyen
Assistant Examiner—Luan V Van

(57) ABSTRACT

Low cost methods for fabricating microneedles are disclosed. According to one embodiment, the fabrication method includes the steps of: providing a substrate; forming a metal-containing seed layer on the top surface of the substrate; forming a nonconductive pattern on a portion of the seed layer; plating a first metal on the seed layer and over the edge of the nonconductive pattern to create a micromold with an opening that exposes a portion of the nonconductive pattern; plating a second metal onto the micromold to form a microneedle in the opening; separating the micromold with the microneedle formed therein from the seed layer and the nonconductive pattern; and selectively etching the micromold so as to release the microneedle. In another embodiment, the micromold is not required. The method according to this embodiment includes: forming a recess with an apex in a substrate; forming a seed layer on the substrate; forming a nonconductive pattern on a portion of the seed layer that is on a sidewall surface of the recess; plating an electrically conductive material over the seed layer and over the edge of the nonconductive pattern to form a plated layer with an opening that exposes a portion of the nonconductive pattern; and separating the plated layer from the seed layer and the nonconductive pattern to release a hollow microneedle with an offset opening.

16 Claims, 18 Drawing Sheets

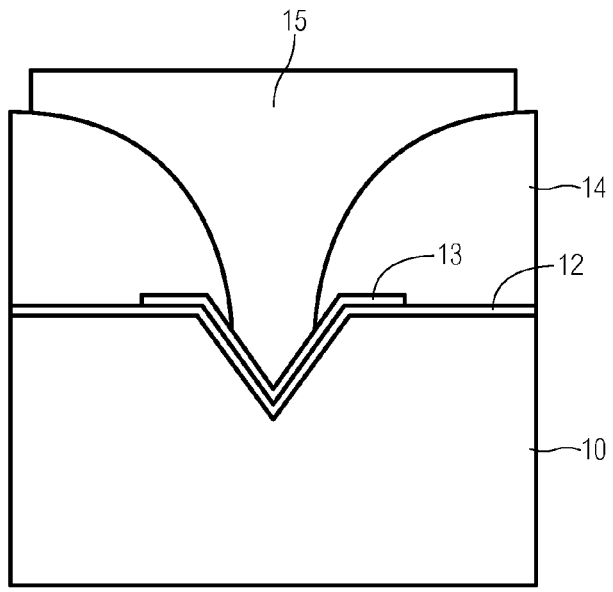
FIG. 7D
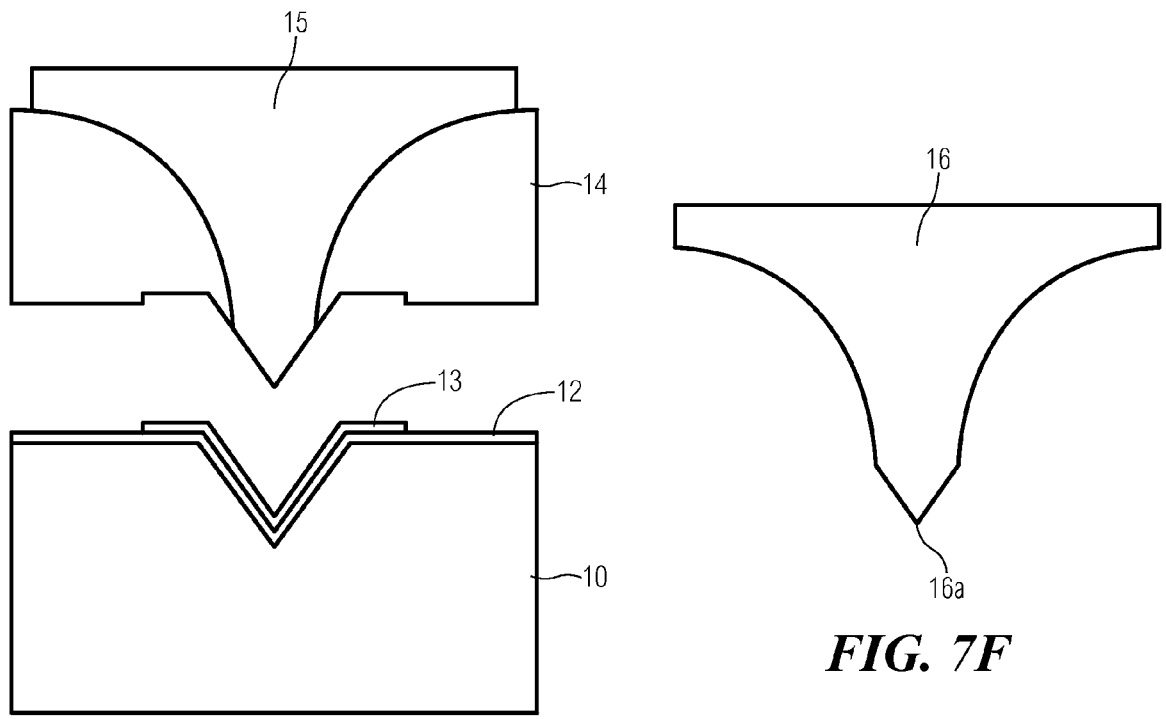
FIG. 7E
FIG. 7F

US 7,785,459 B2

MICRONEEDLES AND METHODS OF FABRICATING

CROSS REFERENCE TO RELATED APPLICATIONS

This application is a continuation-in-part of application Ser. no. 10/972,196 filed on Oct. 22, 2004, now U.S. Pat. No. 7,097,776.

FIELD OF THE INVENTION

The invention is generally related to microneedles and more particularly to methods of fabrication thereof.

BACKGROUND OF THE INVENTION

In the medical field, hollow microneedles have been developed for delivering drugs or withdrawal of bodily fluids across biological barriers, such as skin. A microneedle is a miniature needle with a penetration depth of about 50-150 µm. The microneedle is designed to penetrate the skin but not hit the nerves. An array of microneedles may be combined with an analyte measurement system to provide a minimally invasive fluid retrieval and analyte sensing system. In other fields, solid microneedles are desirable as probes to sense electrical signals or to apply stimulation electrical signals, and hollow microneedles are useful as means for dispensing small volume of materials.

Methods for fabricating microneedles from silicon have been proposed. However, silicon microneedles require expensive processing steps. Furthermore, silicon is susceptible to fracturing during penetration. Alternatively, microneedles may be made from stainless steel and other metals. However, metal microneedles are subject to several disadvantages, one of which is the manufacturing complexities involved in metal processing steps such as grinding, deburring and cleaning. Therefore, a need exists for a method of fabricating metal microneedles that is relatively simple and inexpensive.

SUMMARY OF THE INVENTION

Low cost methods for fabricating microneedles are provided. A fabrication method according to one embodiment includes: providing a substrate; forming a metal-containing seed layer on the top surface of the substrate; forming a nonconductive pattern on a portion of the seed layer; plating a first metal on the seed layer and over the edge of the nonconductive pattern to create a micromold with an opening that exposes a portion of the nonconductive pattern, the opening having a tapered sidewall surface; plating a second metal onto the micromold to form a microneedle in the opening; separating the micromold with the microneedle formed therein from the seed layer and the nonconductive pattern; and selectively etching the micromold so as to release the microneedle.

In another embodiment, the micromold is not required. The method according to this embodiment includes: forming a recess with an apex in a substrate; forming a seed layer on the substrate; forming a nonconductive pattern on a portion of the seed layer that is on a sidewall surface of the recess; plating an electrically conductive layer over the seed layer and over the edge of the nonconductive pattern to form a plated layer with an opening that exposes a portion of the nonconductive pattern; and separating the plated layer from the seed layer and the nonconductive pattern to release a hollow microneedle with an offset opening.

Other aspects and advantages of the present invention will become apparent from the following detailed description, taken in conjunction with the accompanying drawings.

BRIEF DESCRIPTION OF THE DRAWINGS

FIGS. 7A-7F show cross-sectional views illustrating the method steps of FIG. 6.

DETAILED DESCRIPTION

Figure 1:
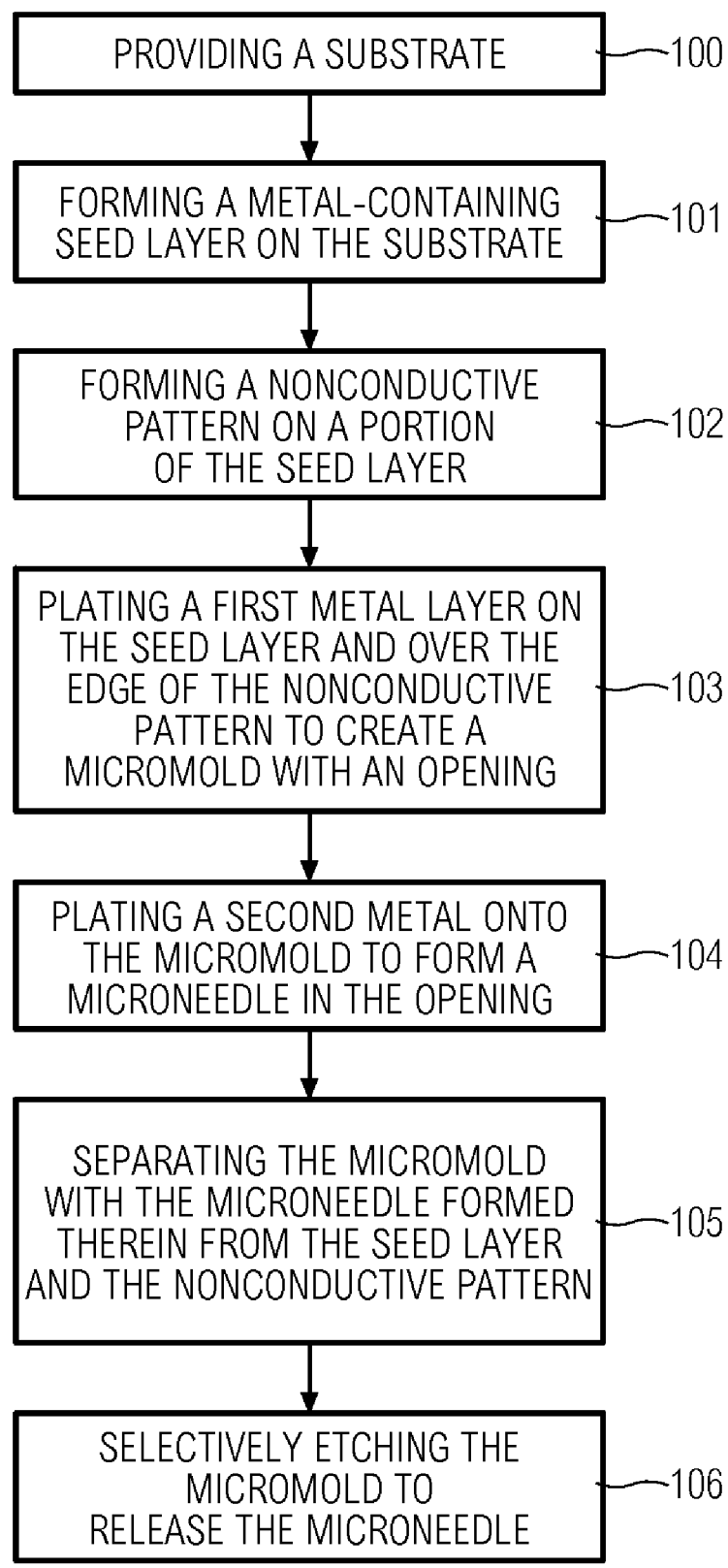
FIG. 1 is a flow chart illustrating a method for fabricating a microneedle in accordance with one embodiment of the present invention.

FIG. 1 is a flow chart illustrating a method for fabricating a microneedle in accordance with an embodiment of the present invention. In this embodiment, a substrate is provided at step 100. A metal-containing seed layer is formed on the substrate at step 101. A nonconductive pattern is formed on a portion of the seed layer at step 102. At step 103, a first metal layer is plated on the seed layer and over the edge of the nonconductive pattern to create a micromold with an opening. Next, a second metal is plated onto the micromold to form a microneedle in the opening at step 104. The micromold together with the microneedle formed therein are separated from the seed layer and the nonconductive pattern at step 105. The micromold is then selectively etched to release the microneedle at step 106.

Figure 2A:
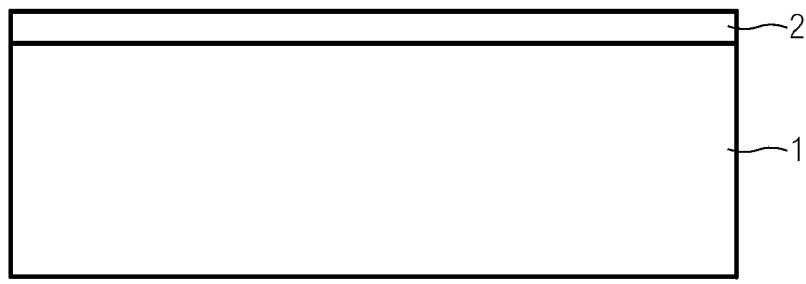
FIGS. 2A-2F show cross-sectional views illustrating the method steps of FIG. 1.

FIGS. 2A-2F show the cross-sectional views illustrating the method steps of FIG. 1. Referring to FIG. 2A, a metal-containing seed layer 2 is formed on a substrate 1. The substrate 1 can be constructed from a semiconductor material such as silicon, a dielectric, a nonconductive material such as glass, a metal such as stainless steel or aluminum, or a pre-molded plastic. The metal-containing seed layer 2 may be a thin layer of chrome, stainless steel, tantalum or gold, which is formed by sputtering or other conventional deposition techniques. The seed layer 2 may also be a bilayer of chrome/stainless steel (chrome being the lower layer) or tantalum/gold (tantalum being the lower layer). The thickness for the seed layer may be between about 500 angstroms to about 200,000 angstroms.

Figure 2B:
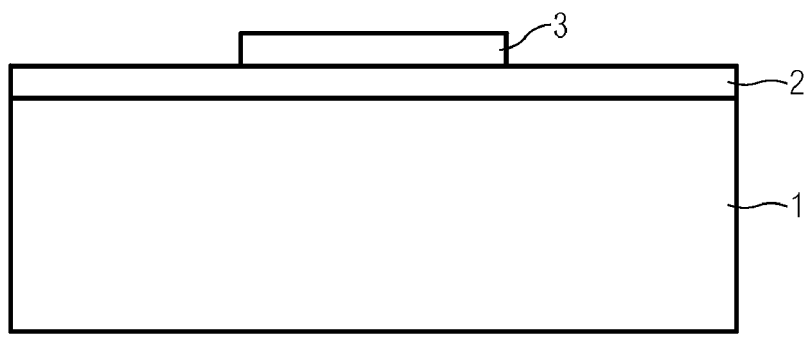

Next, a nonconductive layer is deposited on the seed layer 2 and patterned to produce a nonconductive pattern 3 as shown in FIG. 2B. The patterning of the nonconductive layer may be done by forming a photolithographic mask on the nonconductive layer followed by etching. Suitable materials for the nonconductive pattern 3 include silicon carbide (SiC), photoresist, other polymers, silicon nitride, or silicon oxide. The thickness for the nonconductive pattern may be between about 500 angstroms to about 500,000 angstroms.

Figure 2C:
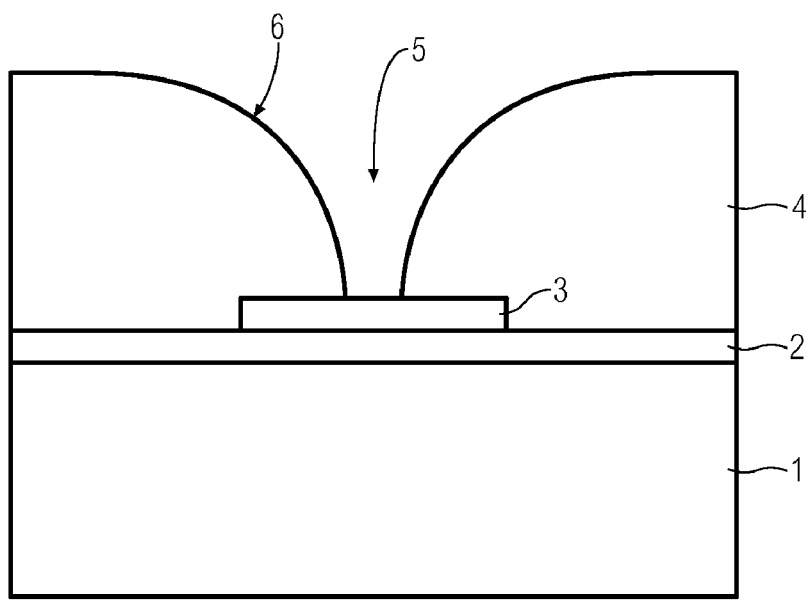

Referring to FIG. 2C, a first metal is plated onto the seed layer 2 and over the edge of the nonconductive pattern 3 so as to form a micromold 4 with an opening 5 that exposes a portion of the nonconductive pattern 3. The plating step may be done by electroplating, which can be controlled to generate an opening with a rounded and tapered sidewall 6 as shown in FIG. 2C. The first metal may be plated to a thickness between about 1 μm to 4 mm. The bottom of the opening 5, which defines the contour for the microneedle's tip to be formed, may have a diameter in the order of 5 μm and 100 μm. The micromold 4 may be constructed of any metal that can be electroplated with good uniformity during plating and can be selectively etched away with respect to other metals. Suitable metals include nickel, tin, tin-lead alloy, aluminum and aluminum alloys.

Figure 2D:
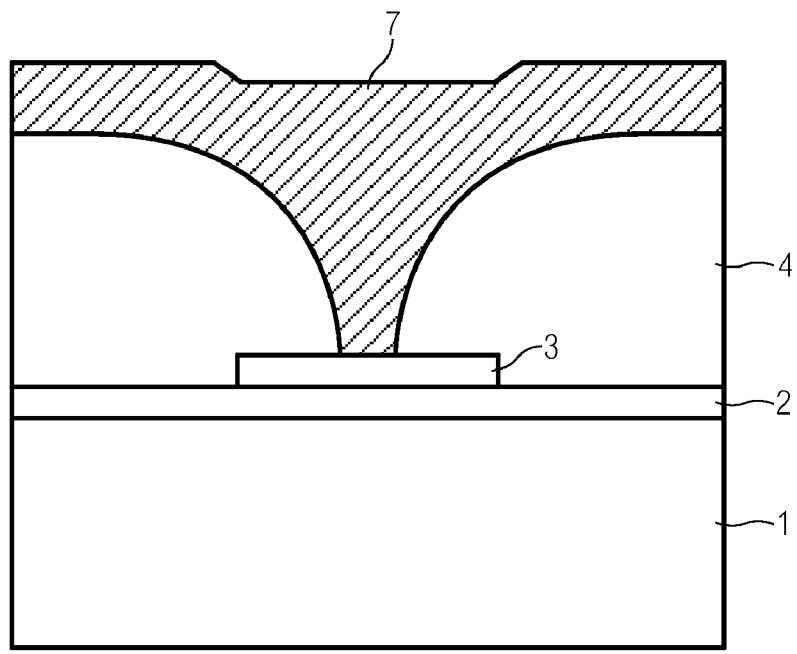

Referring to FIG. 2D, a second metal is plated onto the micromold 4 so as to completely fill the opening 5 and form a microneedle 7. The second metal used to form the microneedle 7 should be different from the first metal used for the micromold 4. The microneedle may be constructed of a variety of metals depending on the intended use. For medical applications, the metal microneedle 7 may be made of palladium, silver, gold, nickel, brass, bronze, or alloys thereof. The properties of the second metal that are required for most applications include mechanical strength, biocompatibility, ability to be easily and uniformly electroplated into thick films, chemical stability (e.g. corrosion resistance), and ability to be selectively etched away from the first metal. For example, nickel may be used for forming the micromold and silver may be used for forming the microneedle because palladium can be selectively etched from nickel using a solution of nitric acid and hydrogen peroxide. It has high mechanical strength, is biocompatible, and can be plated to a relatively thick film.

Figure 2E:
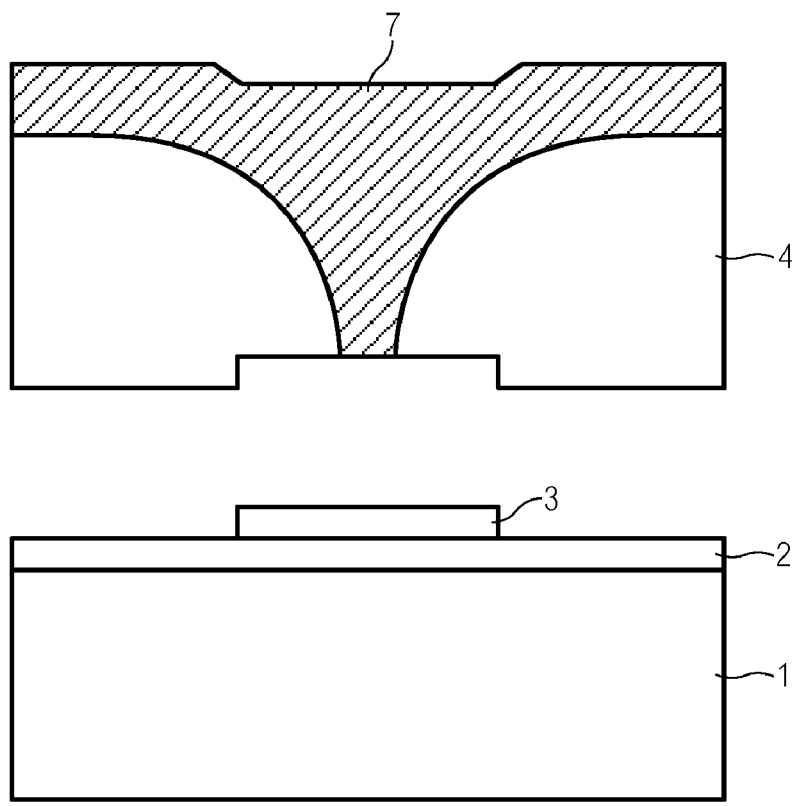

Referring to FIG. 2E, the micromold 4 together with the microneedle 7 are separated from the seed layer 2 and the nonconductive pattern 3. The separation may be performed by peeling away the micromold 4 with the microneedle 7 formed therein. Alternatively, separation may be done with the aid of ultrasonic agitation.

Figure 2F:
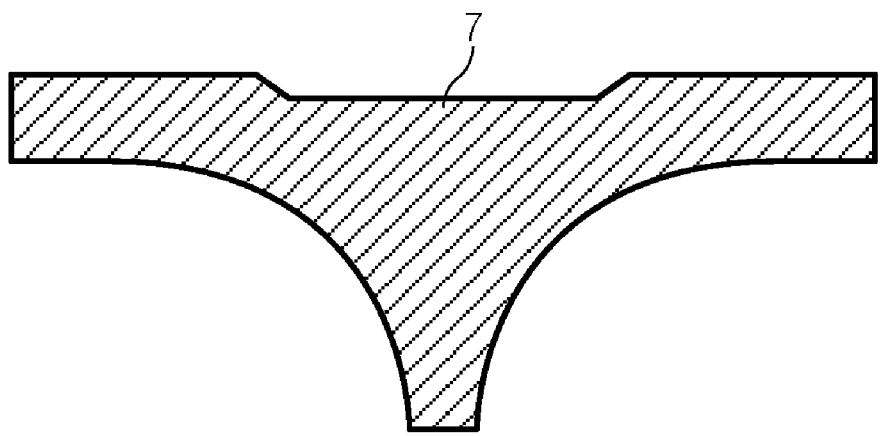

Next, the micromold 4 is selectively etched to release the microneedle 7 as shown in FIG. 2F. If nickel is used to form the micromold 4, the nickel micromold may be selectively etched away using a solution of nitric acid and hydrogen peroxide.

The substrate 1 with the seed layer 2 and the nonconductive pattern 3 formed thereon (FIG. 2B) is a reusable structure upon which additional microneedles may be formed by repeating the plating steps (104-106).

Figure 3:
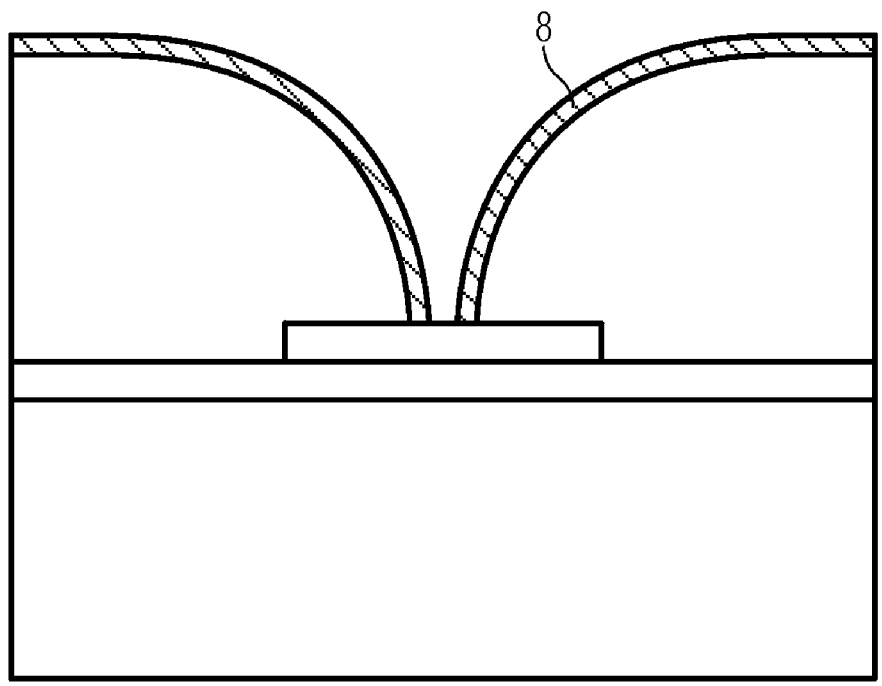
FIG. 3 shows the cross-sectional view of a hollow microneedle formed in accordance with another embodiment of the present invention.

FIG. 2D shows that the second metal completely fills the opening 5 in the micromold 4 to form a solid microneedle 7. However, in another embodiment shown in FIG. 3, the plating thickness of the second metal is controlled so as to form a plated coating on the sidewall of the opening 5, thereby forming a hollow microneedle 8. The second metal may be plated to a thickness in the range from about 5 μm to about 500 μm. Such hollow microneedles are useful for drug injection and extraction of bodily fluids.

Figure 4:
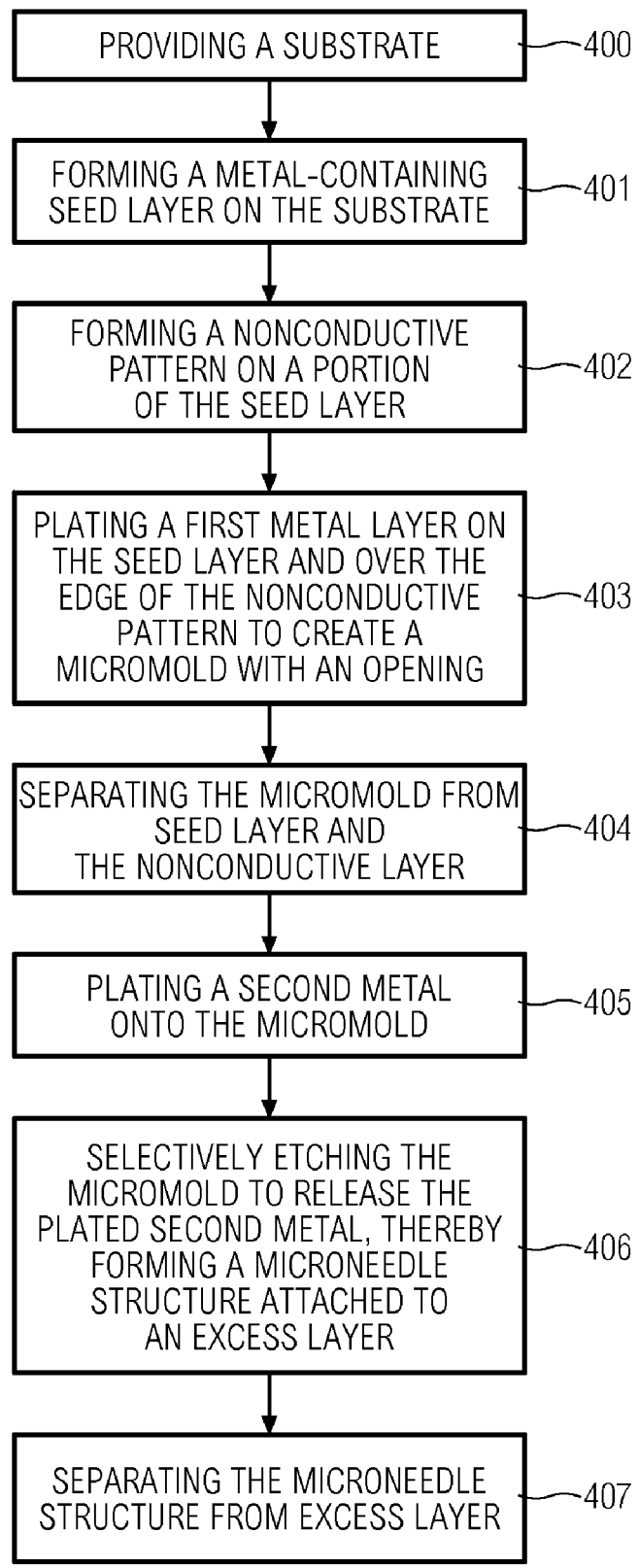
FIG. 4 is a flow chart illustrating a method for fabricating a microneedle in accordance with yet another embodiment of the present invention.

FIG. 4 is a flow chart illustrating a method for fabricating a microneedle in accordance with a third embodiment of the present invention. In this embodiment, a substrate is provided at step 400. A metal-containing seed layer is formed on the substrate at step 401. A nonconductive pattern is formed on a portion of the seed layer at step 402. At step 403, a first metal layer is plated on the seed layer and over the edge of the nonconductive pattern to create a micromold with an opening. The micromold is separated from the seed layer and the nonconductive pattern at step 404. At step 405, a second metal is plated onto the micromold, thereby filling the opening and coating the exposed top and bottom surfaces of the micromold with the second metal. The micromold is selectively etched to release the plated second metal at step 406. The plated second metal from step 406 has the configuration of a microneedle structure attached to an excess layer. The microneedle structure is then separated from the excess layer in step 407.

Figure 5A:
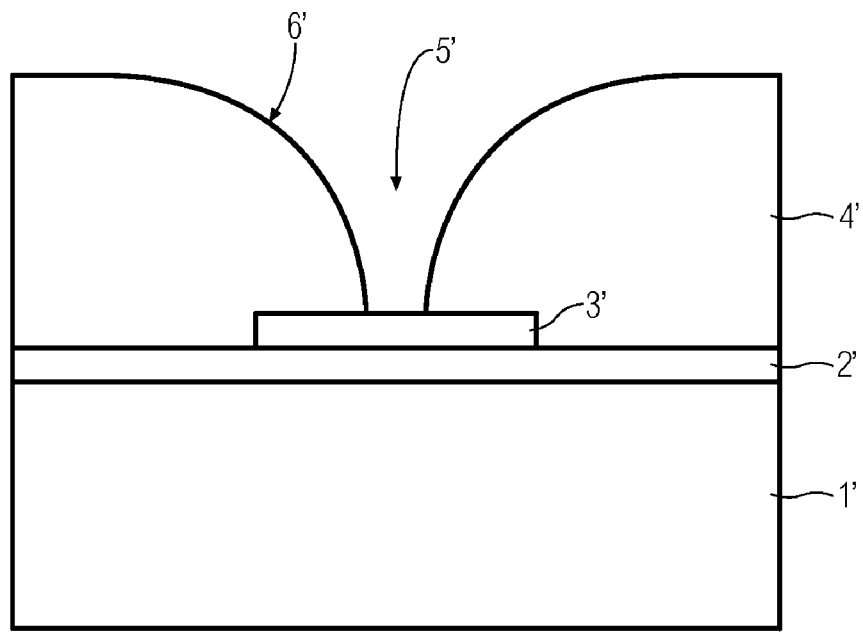
FIGS. 5A-5E show cross-sectional views illustrating the method steps of FIG. 4.
Figure 5B:
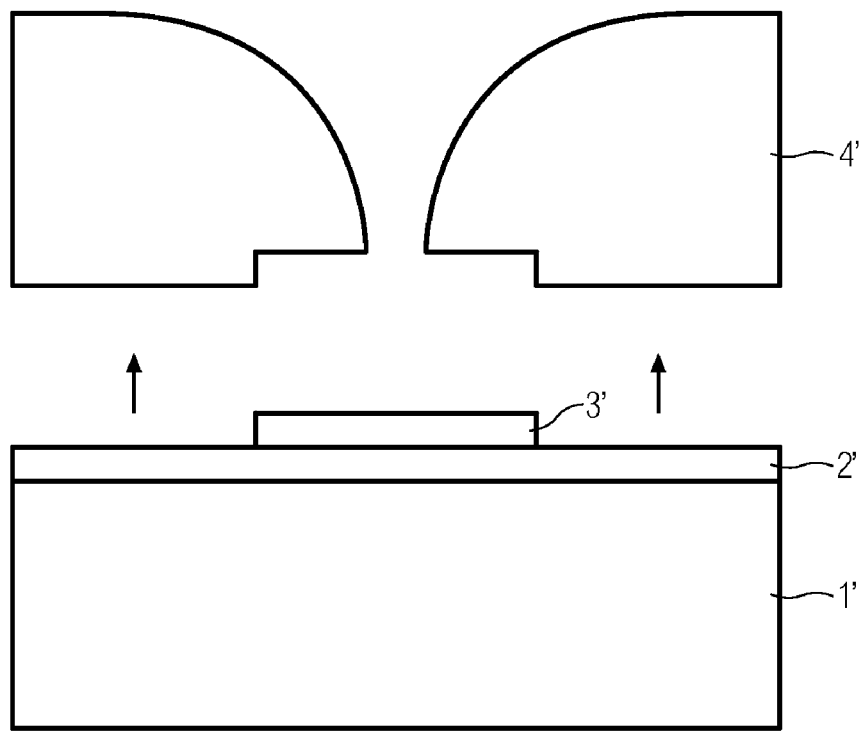
Figure 5C:
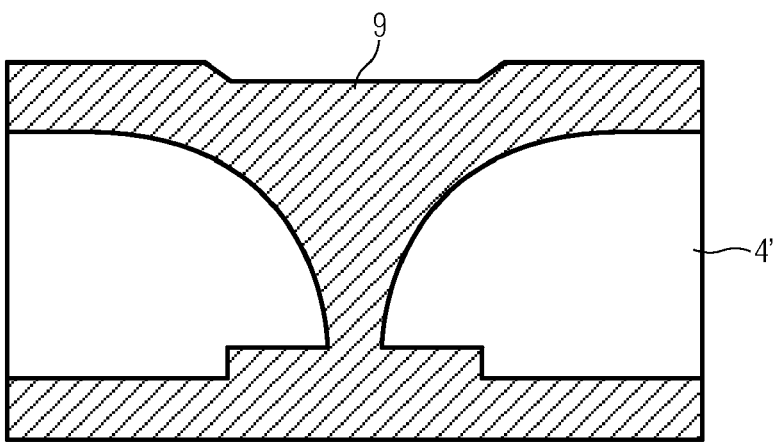
Figure 5D:
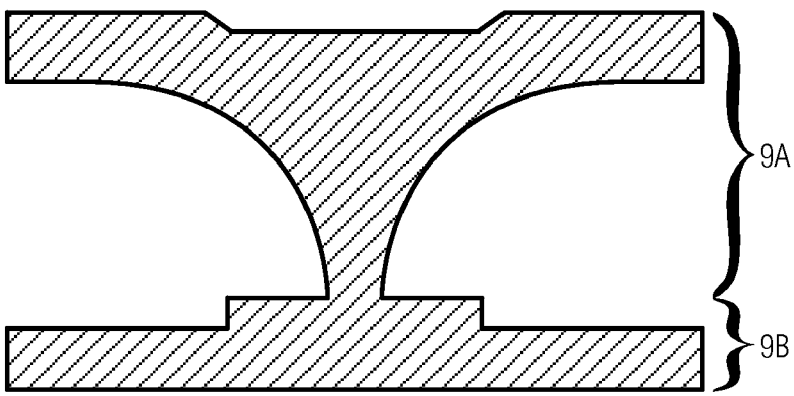
Figure 5E:
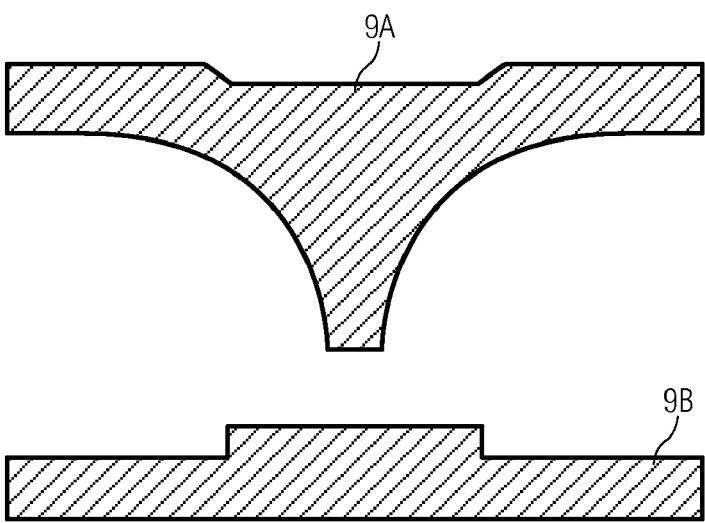

FIGS. 5A-5E show the cross-sectional views illustrating the method steps of FIG. 4. Referring to FIG. 5A, a micromold 4' having an opening 5' is formed on a reusable structure composed of substrate 1', seed layer 2' and the nonconductive pattern 3'. The micromold 4' is then separated from the reusable structure as shown in FIG. 5B. The separated micromold 4' is next placed in a plating station and plating is carried out to fill the opening 5' and cover the upper and lower surfaces of the micromold with a second metal 9 as shown in FIG. 5C. The micromold 4' is then etched away leaving a microneedle structure 9A attached to an excess layer 9B as shown in FIG. 5D. Referring to FIG. 5E, the excess layer 9B is separated from the microneedle structure 9A by mechanical means.

Figure 6:
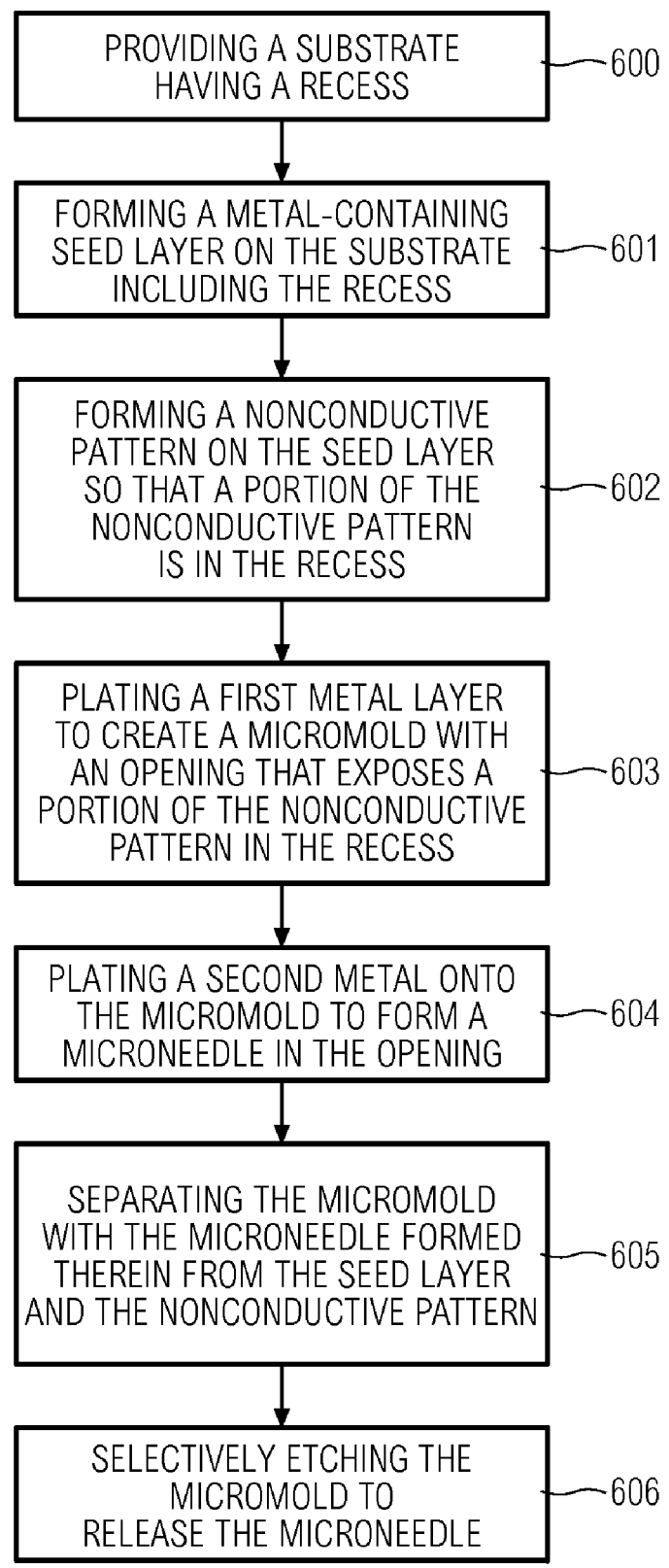
FIG. 6 is a flow chart illustrating a method for fabricating a microneedle with a sharp tip in accordance with yet another embodiment of the present invention.

FIG. 6 is a flow chart illustrating the processing sequence for fabricating a microneedle with a sharp tip in accordance with a fourth embodiment of the present invention. In this embodiment, a substrate having a recess in the top surface is provided at step 600. A metal-containing seed layer is formed on the top surface at step 601. A nonconductive pattern is formed on the seed layer at step 602 so that a portion of the nonconductive pattern is in the recess. At step 603, a first metal layer is plated on the seed layer and over the edge of the nonconductive pattern to create a micromold with an opening. Next, at step 604, a second metal is plated onto the micromold to form a microneedle in the opening. The micromold together with the microneedle formed therein are separated from the seed layer and the nonconductive pattern at step 605. The micromold is then selectively etched to release the microneedle at step 606.

Figure 7A:
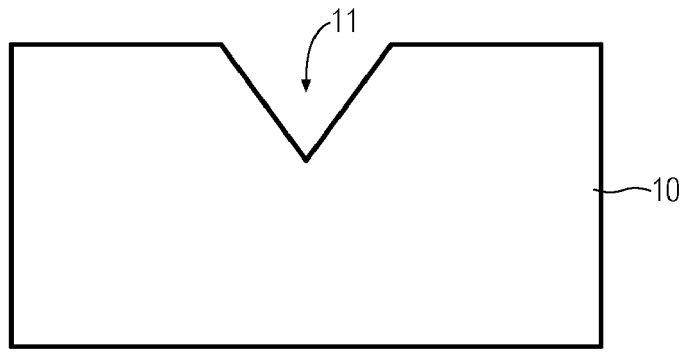

FIGS. 7A-7F show the cross-sectional views illustrating the method steps of FIG. 6. Referring to FIG. 7A, the starting structure is a silicon substrate 10 with a recess 11, which defines the shape of the microneedle's tip to be formed. As examples, the recess 11 may be an inverted pyramidal recess or cone-shaped recess. In an embodiment, the recess 11 is an etched pit formed by anisotropic wet etching using a solution containing tetramethyl ammonium. It will be understood by one skilled in the art that other techniques for forming a recess are possible.

Figure 7B:
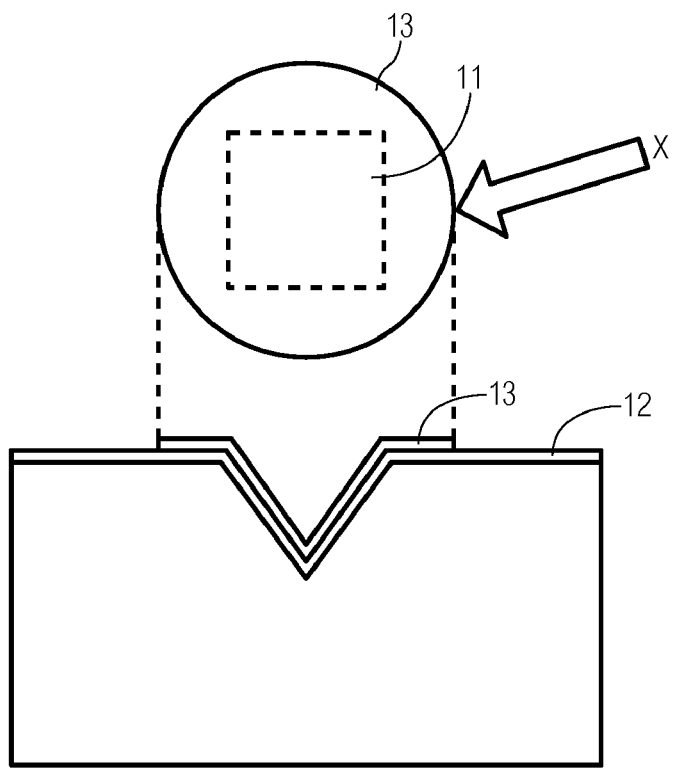
Figure 7C:
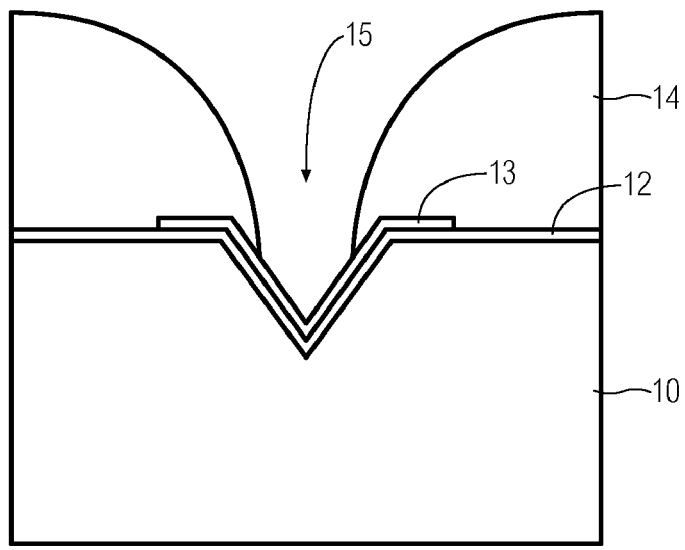

Referring to FIG. 7B, a tri-level seed layer 12 of tantalum-gold-tantalum is sputtered onto the silicon substrate 10 and a SiC pattern 13 is subsequently formed on top of seed layer 12. The SiC pattern 13 is formed by depositing a layer of SiC over the tantalum seed layer 12 followed by masking and etching. The SiC pattern 13 overlies the recess 11 as illustrated by the top view X in FIG. 7B. Next, nickel is electroplated onto the tantalum-gold-tantalum seed layer 12 and over the edge of the SiC pattern 13 to form a micromold 14 with an opening 15 that is vertically aligned with the recess 11 as shown in FIG. 7C.

In the embodiment of FIG. 7B, the SiC pattern 13 is circular in shape, which shape gives rise to a convergent opening with circular cross section. It will be understood by one skilled in the art that other shapes are possible for the nonconductive pattern 13.

Referring to FIG. 7D, palladium is electroplated onto the micromold 14 to form a solid microneedle 16 in the opening 15. Referring to FIG. 7E, the micromold 14 together with the microneedle 16 are separated from the tantalum seed layer 12 and the SiC pattern 13, e.g. by peeling. The nickel micromold 14 is then selectively etched away, e.g. using a solution of nitric acid and hydrogen peroxide, to release the microneedle 16 as shown in FIG. 7F. The microneedle 16 has a sharp, pointed tip 16*a*.

Figure 8:
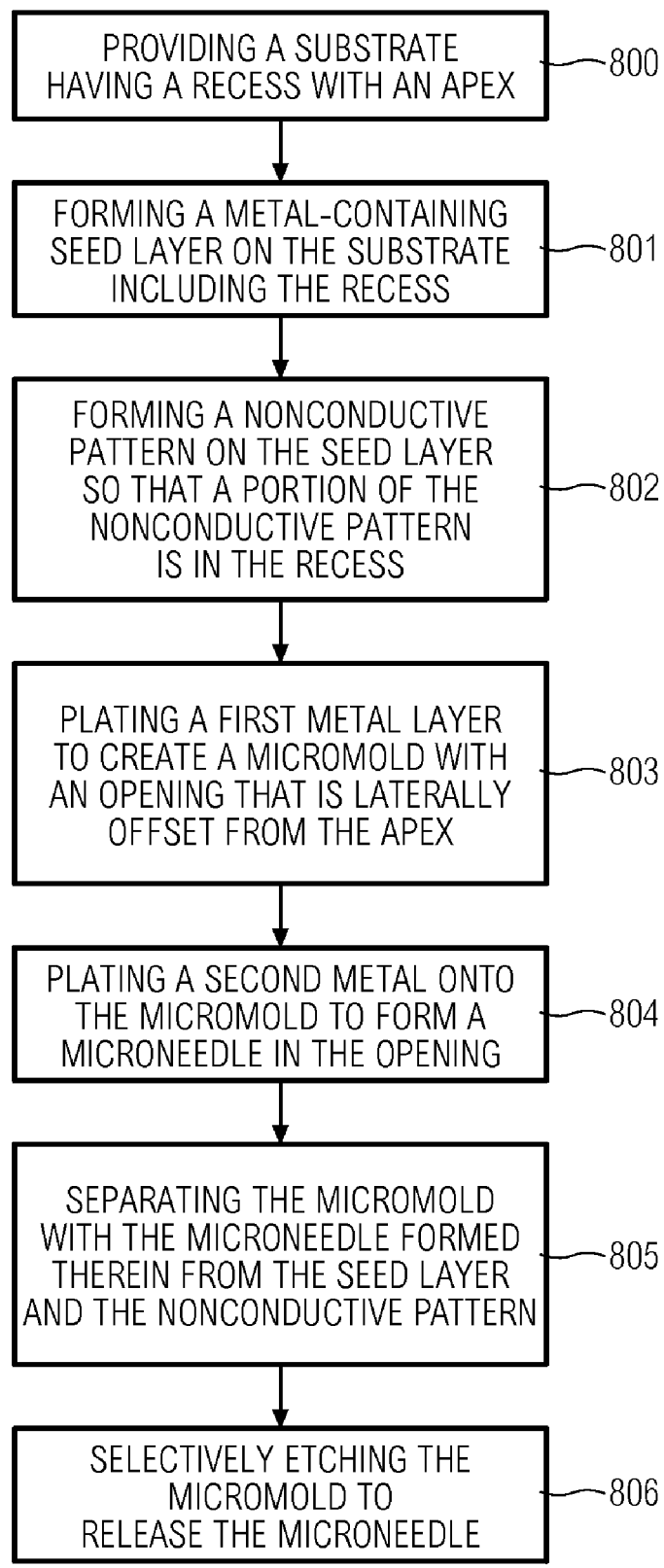
FIG. 8 is a flow chart illustrating a method for fabricating a microneedle with a slanted tip in accordance with yet another embodiment of the present invention.

FIG. 8 is a flow chart illustrating the processing sequence for fabricating a microneedle with a slanted sharp tip in accordance with a fifth embodiment of the present invention. In this embodiment, a substrate having a recess with an apex in the top surface is provided at step 800. A metal-containing seed layer is formed on the top surface at step 801. A nonconductive pattern is formed on the seed layer at step 802 so that a portion of the nonconductive pattern is in the recess. At step 803, a first metal layer is plated on the seed layer and over the edge of the nonconductive pattern to create a micromold with an opening that is laterally offset from the apex. Next, at step 804, a second metal is plated onto the micromold to form a microneedle in the opening. The micromold together with the microneedle formed therein are separated from the seed layer and the nonconductive pattern at step 805. The micromold is then selectively etched to release the microneedle at step 806.

Figure 9A:
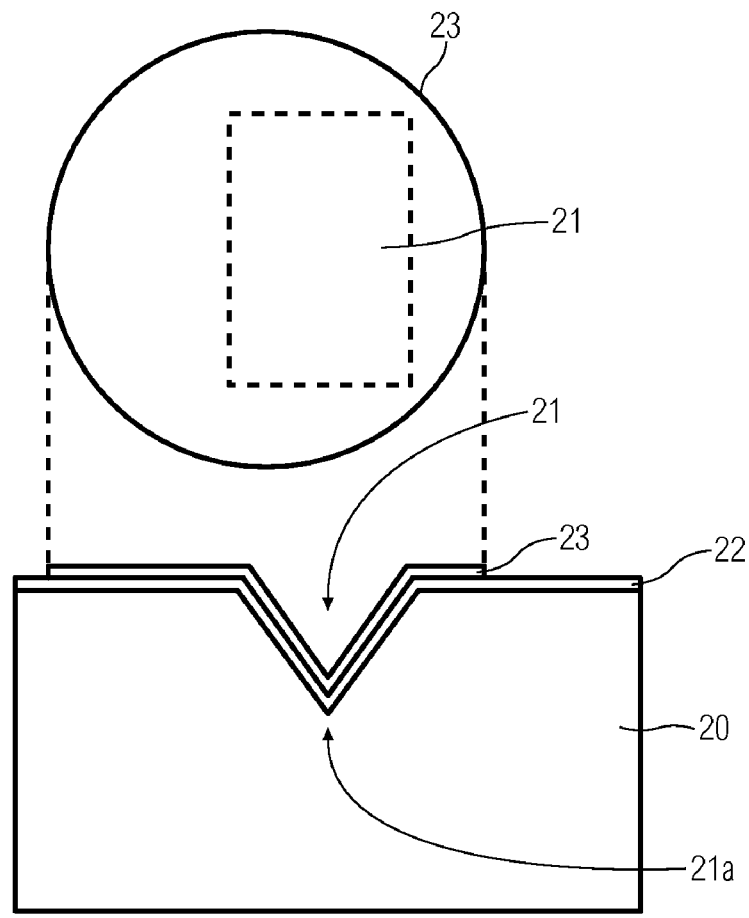
FIGS. 9A-9E show cross-sectional views illustrating the method steps of FIG. 8.
Figure 9B:
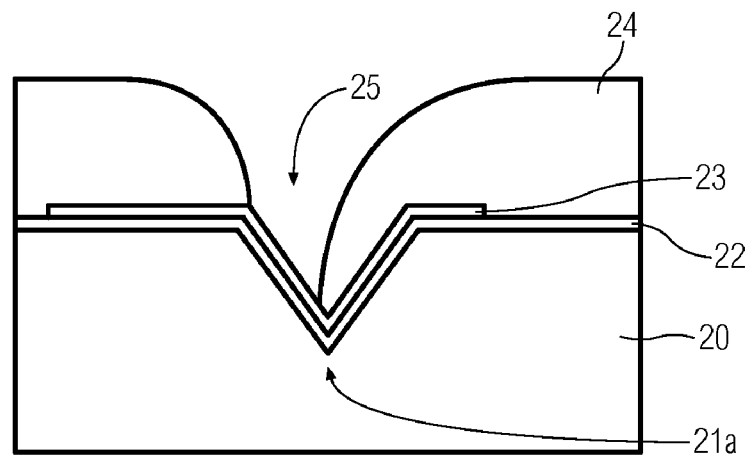
Figure 9C:
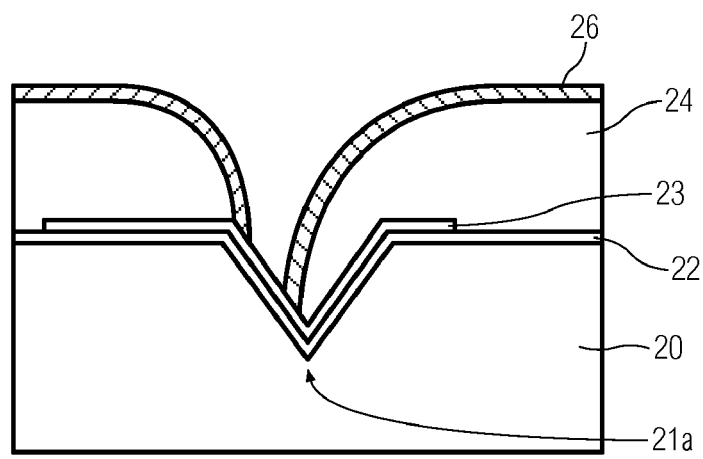
Figure 9D:
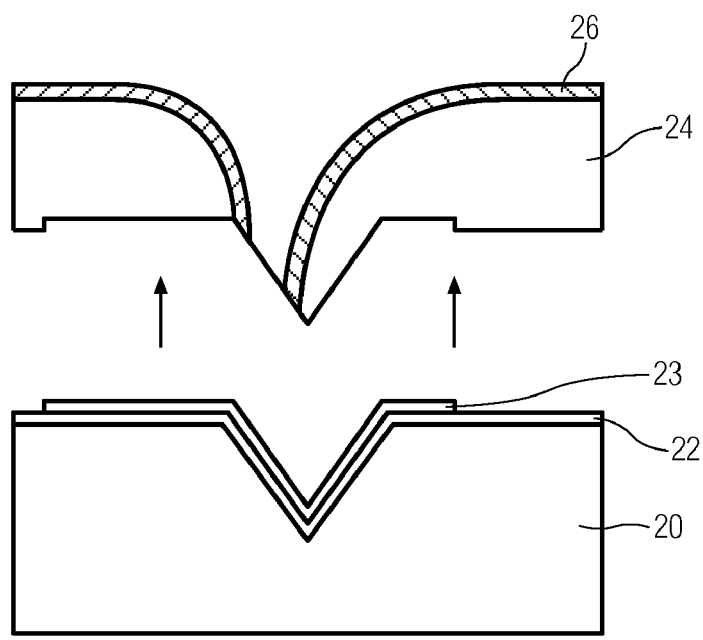
Figure 9E:
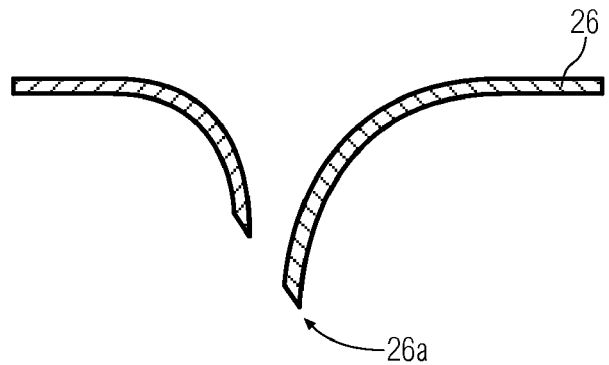

Referring to FIG. 9A, the starting structure is a reusable structure composed of a silicon substrate 20 with an etched pit 21, a tantalum-gold-tantalum seed layer 22, and a SiC pattern 23. The SiC pattern 23 is asymmetrically aligned relative to the apex 21*a* of the etched pit 21. Referring to FIG. 9B, nickel is electroplated onto the tantalum-gold-tantalum seed layer 22 and over the edge of the SiC pattern 23 to form a micromold 24. This plating step results in a micromold 24 with an opening 25 that is offset from the apex 21*a* due to the position of the nonconductive pattern 23. Next, silver is plated onto the sidewall surface of the opening 25 to create a hollow microneedle 26 as shown in FIG. 9C. The micromold 24 and microneedle 26 are separated, e.g. by peeling, from the reusable structure as shown in FIG. 9D. The micromold 24 is then selectively etched to release the microneedle 26 as shown in FIG. 9E. The microneedle 26 has a sharp and slanted tip 26*a*. This needle configuration is particularly useful for extraction of biological fluids and delivery of drugs across the skin with minimal invasion, as well as delivery and extraction of samples across other barriers, such as that of a reagent container.

In the embodiments described with reference to FIGS. 1, 2A-2F, 3, 4, 5A-5E, 6, 7A-7F, 8, 9A-9E, the seed layer is formed of a metal-containing material. It should be understood that the seed layer may be formed of an electrically conductive material other than metal, e.g. conductive polymers. In addition, the materials forming the micromold and the microneedle are not limited to metals but also include electrically conductive materials other than metal, e.g. conductive polymers. In such case, the electrically conductive material forming the seed layer may be different from the materials forming the micromold and the microneedle.

In the methods described thus far, a micromold is required. In the following embodiments a micromold is not required.

Figure 10:
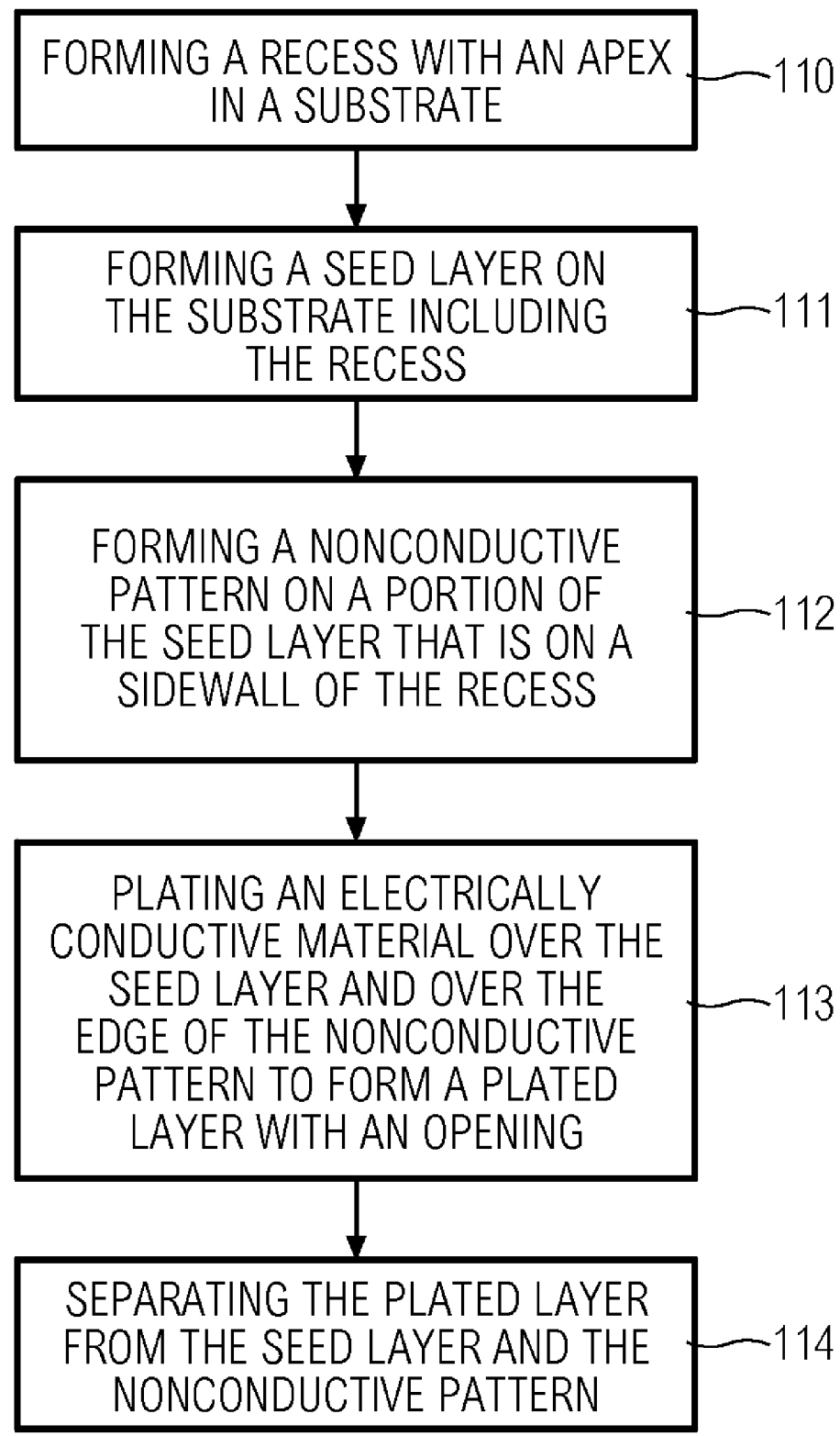
FIG. 10 is a flow chart illustrating a method for fabricating a hollow microneedle with an offset opening in accordance with yet another embodiment of the present invention.

FIG. 10 is a flow chart illustrating a method for fabricating a hollow microneedle with an offset opening, wherein a micromold is not required. At step 110, a recess with an apex is formed in a substrate. A variety of shapes for the recess may be created, e.g. conical, pyramidal, depending on the material of the substrate. The recess defines the shape of the microneedle to be formed and the apex of the recess defines the tip of the microneedle to be formed. At step 111, an electrically conductive seed layer is formed on the substrate including the recess. At step 112, a nonconductive pattern is formed on a portion of the seed layer that is on a sidewall of the recess. At step 113, an electrically conductive material is then plated onto the seed layer and over the edge of the nonconductive pattern to form a plated layer with an opening that exposes a portion of the nonconductive pattern. The plated material is different from the electrically conductive material forming the seed layer. The plated material conforms to the shape of the recess to create the shape of the microneedle. Because of the location of the nonconductive pattern, the opening is off-center and laterally offset from the apex of the recess. At step 114, the plated layer is separated from the seed layer and the nonconductive pattern to release a hollow microneedle with an offset opening.

Figure 11A:
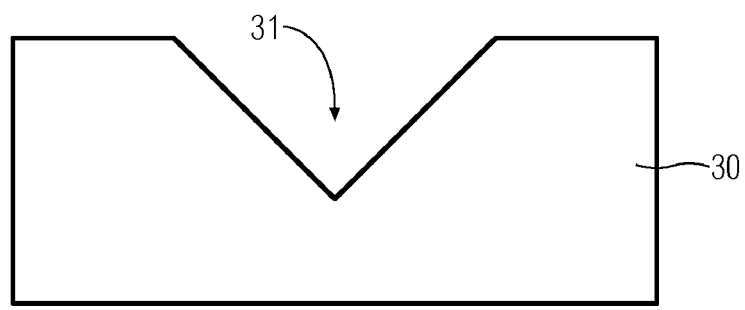
FIG. 11A-11F show cross-sectional views illustrating the method steps of FIG. 10.

FIGS. 11A-11E show the cross-sectional views illustrating the method steps of FIG. 10. Referring to FIG. 11A, a recess 31 with an apex 31*a* is formed in a substrate 30. The materials suitable for the substrate 30 may be varied as discussed above for the method depicted by FIGS. 2A-2F. In one embodiment, the substrate is made of silicon, and the recess is a pyramidal etch pit formed by masking the substrate and anisotropic wet etching using a solution containing tetramethyl ammonium.

Figure 11B:
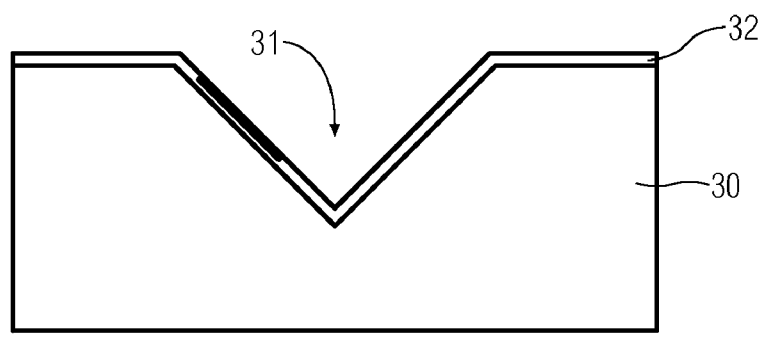
Figure 11C:
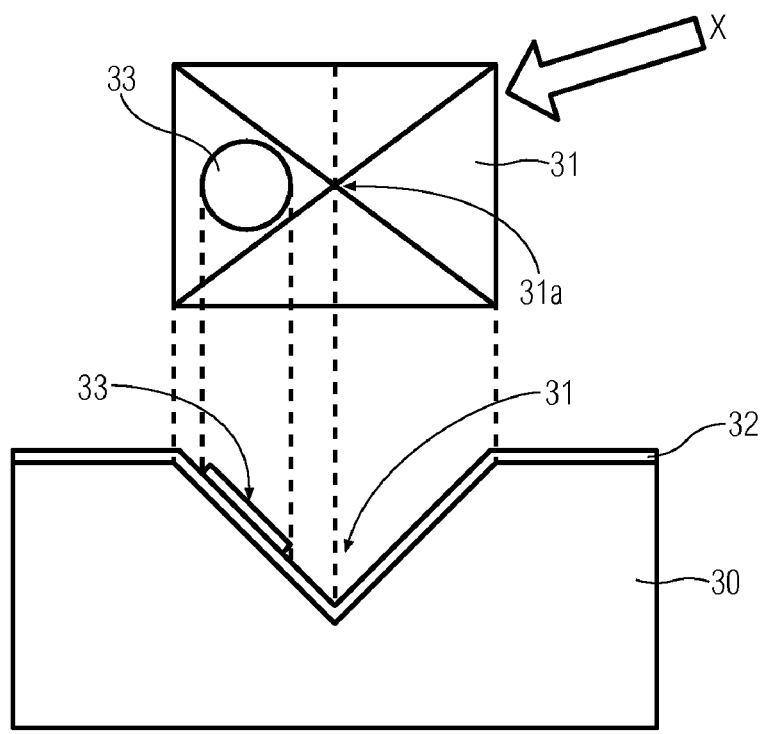

Referring to FIG. 11B, a seed layer 32 is formed over the top surface of the substrate 30 such that the recess 31 is covered by the seed layer. The seed layer 32 is formed of an electrically conductive material. Next, a nonconductive pattern 33 is formed over a portion of the seed layer that is on a sidewall of the recess 31 as shown in FIG. 11C. The nonconductive pattern 33 is in the recess 31 and laterally offset from the apex 31*a* as illustrated by the top view X in FIG. 11C. The materials suitable for the nonconductive pattern 33 may be varied as discussed above for the method depicted by FIGS. 2A-2F.

Figure 11D:
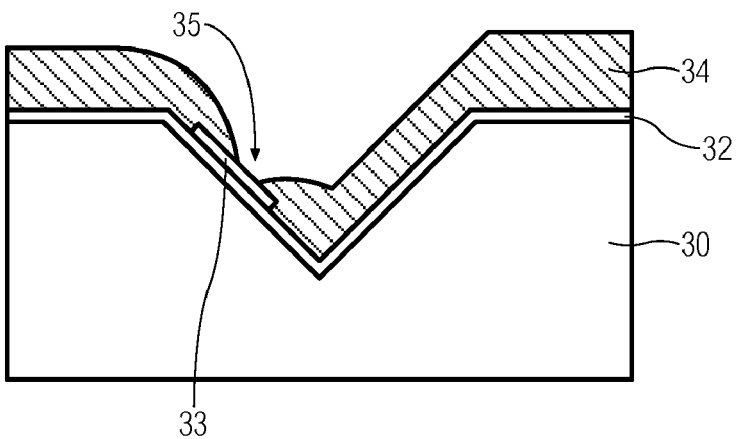
Figure 11E:
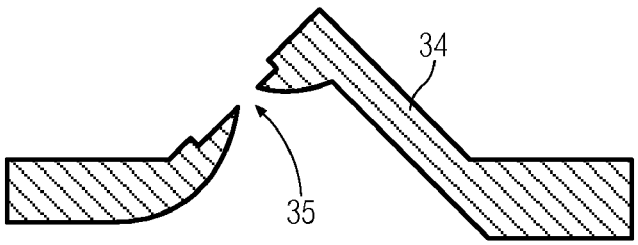
Figure 11F:
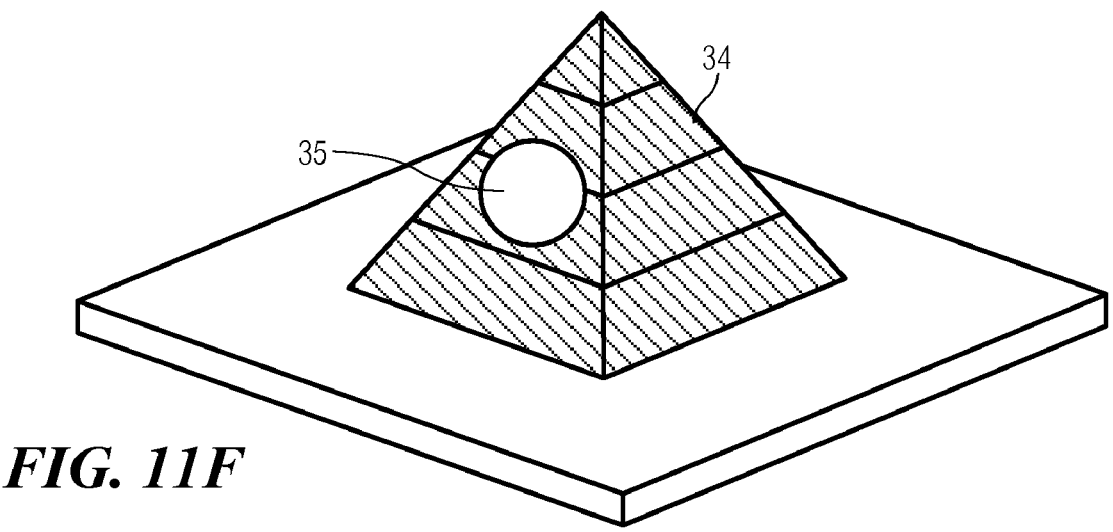

Referring to FIG. 11D, an electrically conductive material is electroplated onto the seed layer and over the edge of the nonconductive pattern 33 to create a plated layer 34 with an offset opening 35 that exposes a portion of the nonconductive pattern 33. The electrically conductive material used for forming the plated layer 34 is different from the electrically conductive material forming the seed layer. The plated layer 34 conforms to the shape of the recess 31 as shown in FIG. 11 to define the body of the microneedle. The opening 35 is a tapered through hole extending through the thickness of the microneedle. The location and shape of the nonconductive pattern 33 defines the location and shape of the opening 35. Referring to FIG. 11E, the plated layer 34 is separated from the seed layer 32 and the nonconductive pattern 33 to release a free-standing microneedle 34. FIG. 11F shows an isometric view of the pyramidal microneedle 34 with the offset opening 35.

Modifications may be made to the embodiment shown in FIGS. 11A-11G so as to create various shapes for the microneedle as well as various shapes for the offset opening. For example, the contour of the substrate may be complex, i.e. having multiple features of different vertical and lateral dimensions. In the embodiment shown in FIG. 11C, the nonconductive pattern 33 is circular in shape. However, other shapes for the nonconductive pattern 33 are possible, for example, square, triangle, star-shape.

Figure 12:
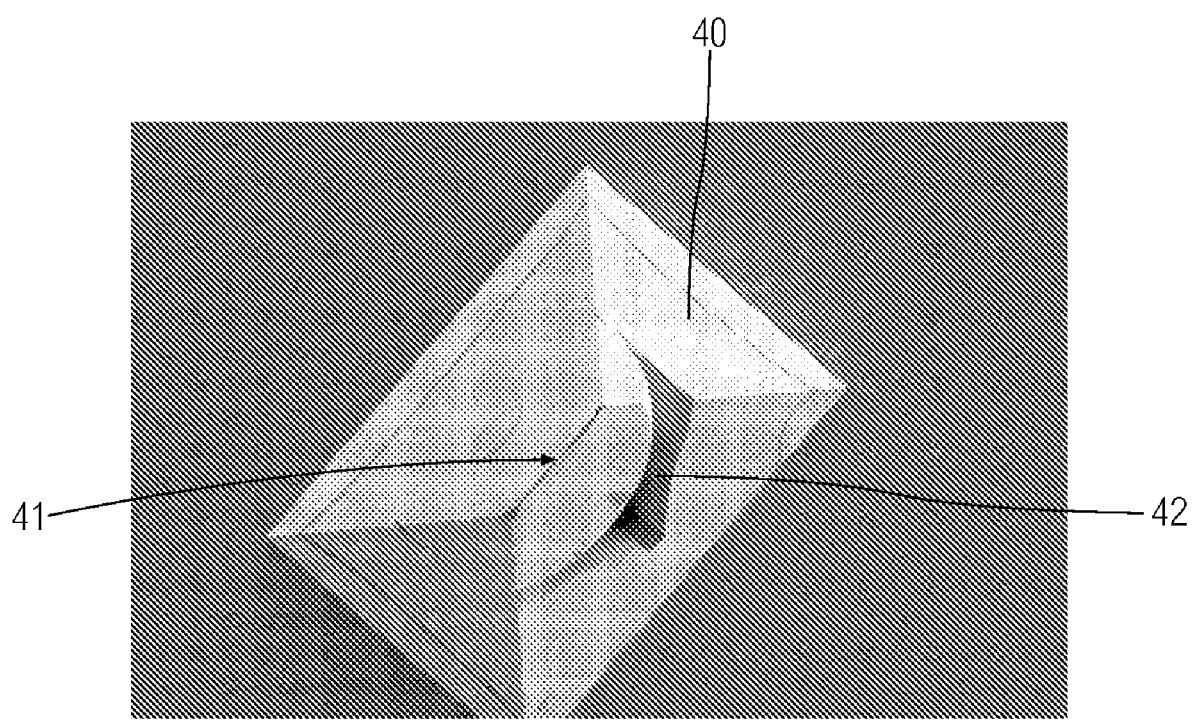
FIG. 12 is a micrograph showing an exemplary pyramidal microneedle having a tip with a sharp cutting edge and an irregular-shape offset opening in accordance with yet another embodiment of the present invention.

In yet another embodiment of the invention, substantially the same method described with reference to FIGS. 11A-11F is carried out to produce a microneedle as shown in FIG. 12. In this embodiment, however, the recess 31 and the nonconductive pattern 33 are modified so as to create a pyramidal microneedle 40 having a tip with a sharp cutting edge 41 and an irregularly shaped offset opening 42.

Figure 13A:
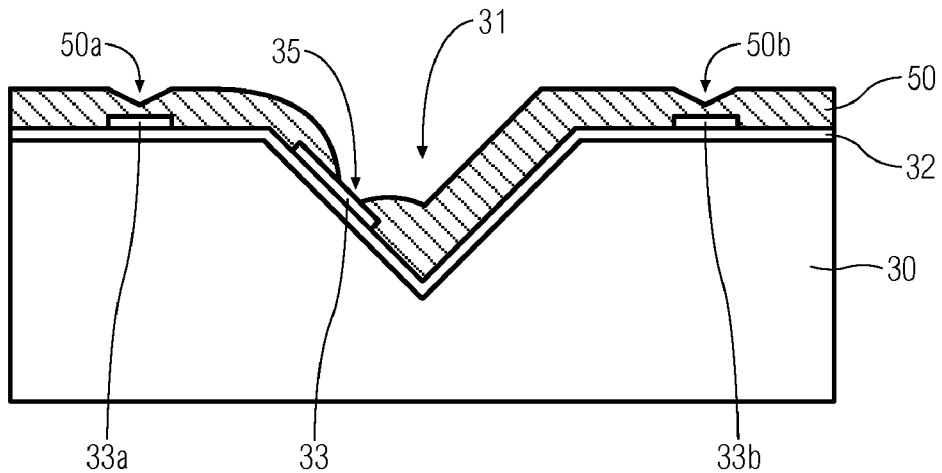
FIGS. 13A-13B show cross-sectional views illustrating a method for fabricating a hollow microneedle with a modified surface contour in accordance with yet another embodiment of the present invention.
Figure 13B:
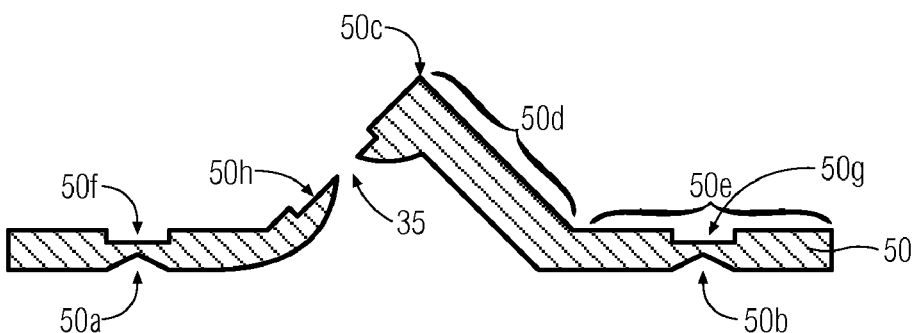

FIGS. 13A and 13B show another embodiment of the invention wherein the method for fabricating the microneedle is substantially the same as the method described with reference to FIGS. 11A-11F. In this embodiment, however, additional nonconductive patterns 33a and 33b are formed on portions of the seed layer 32 that are outside of the recess 31 as shown in FIG. 13A. Electroplating results in a plated layer 50 having a through hole 35 and depressions 50a and 50b, wherein the depressions 50a and 50b are formed at locations corresponding to the nonconductive patterns 33a and 33b as shown in FIG. 13A. The size and shape of the nonconductive patterns 33a and 33b define the size and shape of the depressions 50a and 50b. The term "depression" as used herein is intended to include indentation, pit, recess, concave surface, or contoured area of a surface that is lower than the surface around it. In addition, electroplating can be controlled so as to create shallow or deep depressions. In general, each of the nonconductive patterns 33a and 33b should have a width that is smaller than the width of the nonconductive pattern 33, and the minimum thickness of the plated metal 34 that is required to completely cover the nonconductive patterns 33a and 33b is equal to the thickness of the nonconductive patterns 33a and 33b plus one-half the width of the nonconductive pattern.

Referring to FIG. 13B, after electroplating, the plated layer 50 is separated from the seed layer 32 and nonconductive patterns 33, 33a, 33b to release a free-standing microneedle with an offset opening 35. The opening 35 is laterally offset from the tip 50c of the microneedle 50. As shown in FIG. 13B, the microneedle 50 has a tapered hollow body 50d and a base 50e. The depressions 50a and 50b provide weakened sections in the base 50e so that there is a tendency for the base to break at these weakened sections instead of the needle body. In this way, the microneedle tip does not tend to break off during use. This feature is particularly advantageous when the microneedle is used to puncture a surface, such as when the microneedle is used to administer drugs through skin or other tissues into a human or animal body. Furthermore, channels 50f, 50g, and 50h are also created due to the contour of the nonconductive patterns 33a, 33b and 33, respectively. Such channels are particularly useful for drug delivery where the microneedle is coated with a medication because the channels increase the surface area within which the medication is available to the body. As one example, a spiral-shaped nonconductive pattern may be used to create a spiral channel in the base of the microneedle. Such spiral channel would greatly enhance the drug delivery capability of the microneedle.

In the embodiment of FIGS. 13A and 13B, three nonconductive patterns 33, 33a, 33b are shown. It should be understood by those skilled in the art that the number of the nonconductive patterns may be controlled so as to produce any number of openings or depressions within the microneedle body. Furthermore, the nonconductive patterns can be used to further modify the surface topography of the microneedle.

Figure 14:
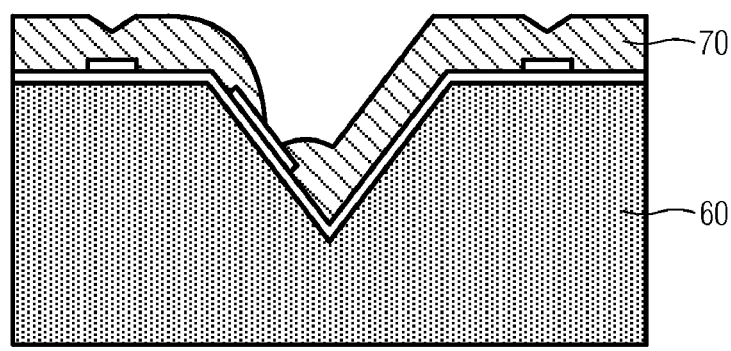
FIG. 14 shows a cross-sectional view illustrating a method for fabricating a hollow microneedle using molded plastic substrate in accordance with yet another embodiment of the present invention.

FIG. 14 shows another embodiment of the invention wherein the method for fabricating the microneedle 70 is substantially the same as the method described with reference to FIGS. 13A-13B. In this embodiment, however, the substrate 30 is a molded plastic with a recess 61 that is produced by molding. Molding provides flexibility in the shaping of the recess 61. By using molded plastic as the substrate 60, a microneedle with a steeper, tapering sidewall can be fabricated.

The microneedles fabricated by the above methods may have the following dimensions: a height in the range from about 2 μm to about 500 μm, a base diameter in the range from about 5 μm to about 1000 μm. For hollow microneedles, the luminal diameter (i.e., the diameter of the opening at the tip) is in the range from about 5 μm to about 150 μm. For microneedles that are fabricated by the methods that do not require a micromold, the dimensions of the microneedles are limited only by the limitations due to forming the desired structures in the substrate, by means such as, but not limited to, etching or molding the substrate to create the configuration of the microneedle. As such, the height may be more than 400 μm or less than 20 μm.

All of the above methods can be adapted to form a plurality of microneedles simultaneously. In such case, the method steps are the same as described above except that a plurality of microneedles are formed on a common substrate instead of just one. Other modifications to the above methods are also possible. For example, two different metal materials may be used to form the plated microneedle shape. The electroplating process can be controlled such that the tip of the microneedle is formed of a material different from the base of the microneedle. Furthermore, instead of plating metals onto a substrate to form the microneedle shape, conductive polymers may be plated. Although electroplating has been discussed in some embodiments, it should be understood by those skilled in the art that other conventional plating methods are possible.

The microneedle fabricated by the above methods may be integrated with a measurement means to provide a fluid sampling and measurement device. Furthermore, the hollow microneedle may be attached to a reservoir chamber that holds drugs, reagents, or other materials to be delivered for various applications, including therapeutic or diagnostic applications. Alternatively, the microneedle may be coated with a chemical to be introduced into a subject. As an example, the surface of the microneedle may coated with a first chemical that allows a second chemical within the reservoir to be easily assimilated. As another example, the microneedle may be coated with a chemical that enables a sample to be easily extracted.

One advantage of the pyramid shape shown in FIGS. 11F and 12 is that the microneedle may be coated with a coating material or chemical of choice, e.g. antimicrobial, anticoagulant, antifungal, lubricant, etc., without producing puddles or uncovered edges along the tapering sidewalls of the microneedle body.

The hollow microneedle with the offset opening enables certain unique applications. The sharp tip may be used to penetrate a barrier layer and the tip is then dissolved by a fluid under the barrier layer, thereby increasing the flow of the material being injected through the microneedle. A tip with a central bore hole could not provide such flow so easily because the central bore hole would likely be clogged at the initial insertion of the tip.

The hollow microneedle with the offset opening also has industrial application in the field of adhesive or lubricant dispensing. For such application, the hollow microneedle is attached to a reservoir chamber containing adhesive or lubricant, and means is provided to dispense the adhesive or lubricant through the opening of the microneedle. The offset opening provides certain advantages when the microneedle is used for such application. When the microneedle tip is held above a target object, the offset opening keeps the tip relatively clean until the initial use, especially in a dirty environment. An array of such hollow microneedles may be incorporated in a dispensing device whereby each microneedle in the array is used until it is clogged and a new microneedle is opened.

While certain embodiments have been described herein in connection with the drawings, these embodiments are not intended to be exhaustive or limited to the precise form disclosed. Those skilled in the art will appreciate that obvious modifications and variations may be made to the disclosed embodiments without departing from the subject matter and spirit of the invention as defined by the appended claims.

What is claimed is:

1. A method of fabricating a microneedle, said method comprising:
   (a) forming a recess with an apex in a substrate;
   (b) forming a seed layer on the substrate including the recess;
   (c) forming a nonconductive pattern on a portion of the seed layer that is on a sidewall of the recess;
   (d) plating an electrically conductive material on the seed layer and over the edge of the nonconductive pattern to create a plated layer with an opening that exposes a portion of the nonconductive pattern and is laterally offset from the apex; and
   (e) separating the plated layer from the seed layer and the nonconductive pattern to release a hollow microneedle comprising a tip and an opening laterally offset from the tip.

2. The method as recited in claim 1, wherein the substrate comprises silicon, and the recess is an etched pit which defines the contour of the tip of the microneedle.

3. The method as recited in claim 2, wherein the recess has an inverted pyramidal shape.

4. The method as recited in claim 1, wherein the seed layer comprises an electrically conductive material that is different from the material forming the plated layer.

5. The method as recited in claim 4, wherein the seed layer comprises a metal.

6. The method as recited in claim 4, wherein the seed layer comprises a conductive polymer.

7. The method as recited in claim 1, wherein the nonconductive pattern is formed of a material selected from a group consisting of silicon carbide and photoresist.

8. A method of fabricating a microneedle, said method comprising:
   (a) providing a substrate having a recess with an apex;
   (b) forming a seed layer on the substrate including the recess;
   (c) forming a first nonconductive pattern on a portion of the seed layer that is on a sidewall of the recess;
   (d) forming at least one second nonconductive pattern on a portion of the seed layer that is outside of the recess;
   (e) plating an electrically conductive layer on the seed layer and over the first and second nonconductive patterns to form a plated layer having an opening that exposes a portion of the first nonconductive pattern and a depression that corresponds to the location of said at least one second nonconductive pattern; and
   (f) separating the plated layer from the seed layer and the nonconductive patterns to release a hollow microneedle comprising a tip, an opening laterally offset from the tip, and a depression that defines a weakened section of the microneedle.

9. The method as recited in claim 8, wherein the recess is formed by etching the substrate.

10. The method as recited in claim 8, wherein the substrate is made of plastic and the recess is formed by molding.

11. The method as recited in claim 8, wherein step (d) comprises forming a plurality of second nonconductive patterns on portions of the seed layer that are outside the recess, whereby the plated layer contains a plurality of depressions that correspond to the locations of the second nonconductive patterns.

12. The method as recited in claim 8, wherein said hollow microneedle further comprises a channel that conforms to the contour of said at least one second nonconductive pattern.

13. A method of fabricating a microneedle, said method comprising:
   (a) providing a substrate having a recess with an apex;
   (b) forming a seed layer on the substrate including the recess;
   (c) forming a first nonconductive pattern on a portion of the seed layer that is on a sidewall of the recess, said first nonconductive pattern defining the location of a through hole in the microneedle to be fabricated;
   (d) forming a plurality of second nonconductive patterns on different portions of the seed layer;
   (e) plating an electrically conductive layer on the seed layer and over the first and second nonconductive patterns to form a plated layer having an opening that exposes a portion of the first nonconductive pattern and depressions that correspond to the second nonconductive patterns; and
   (f) separating the plated layer from the seed layer and the nonconductive patterns to release a hollow microneedle comprising a tip, an opening laterally offset from the tip, and various contoured surfaces.

14. A method of fabricating a microneedle, said method comprising:
   (a) providing a substrate having a recess with an apex;
   (b) forming a seed layer on the substrate including the recess;
   (c) forming a plurality of nonconductive patterns on different portions of the seed layer;
   (d) plating an electrically conductive layer on the seed layer and over the nonconductive patterns to form a plated layer having a plurality of openings that correspond to the nonconductive patterns; and
   (e) separating the plated layer from the seed layer and the nonconductive patterns to release a hollow microneedle comprising a plurality of openings.

15. A method of fabricating a microneedle, said method comprising:
   (a) providing a substrate having a recess with an apex;
   (b) forming a seed layer on the substrate including the recess;
   (c) forming a plurality of nonconductive patterns on different portions of the seed layer;

(d) plating an electrically conductive layer on the seed layer and over the nonconductive patterns to form a plated layer having at least one opening that corresponds to one of the nonconductive patterns and at least one depression that corresponds to another nonconductive pattern; and (e) separating the plated layer from the seed layer and the nonconductive patterns to release a hollow microneedle comprising at least one opening and at least one depression.

16. A method of fabricating a plurality of microneedles, said method comprising the steps of:

(a) providing a substrate with a plurality of recesses;

(b) forming a seed layer on the substrate including the recesses;

(c) forming a plurality of nonconductive patterns over the seed layer, each nonconductive pattern being formed on a portion of the seed layer that is on a sidewall of a recess;

(d) plating an electrically conductive material on the seed layer and over the edges of the nonconductive patterns to form a plated layer with a plurality of openings, each opening exposing a portion of a corresponding nonconductive pattern;

(e) separating the plated layer from the seed layer and the nonconductive patterns to release an array of microneedles, each microneedle having a tip and an opening laterally offset from the tip.

* * * * *